United States Patent

Spell, II et al.

[11] Patent Number: 6,029,708
[45] Date of Patent: Feb. 29, 2000

[54] PULSATION DAMPER FOR A HYDRAULIC ELEVATOR

[75] Inventors: Charles P. Spell, II; Terry D. Holmes, both of Clinton, N.C.; Dean Chow, Hackettstown, N.J.

[73] Assignee: Inventio AG, Hergiswill NW., Switzerland

[21] Appl. No.: 09/038,472

[22] Filed: Mar. 11, 1998

[51] Int. Cl.⁷ ..................................... F16L 55/04
[52] U.S. Cl. ................... 138/30; 138/26; 138/31
[58] Field of Search .................. 138/28, 30, 31

[56] References Cited

U.S. PATENT DOCUMENTS

| | | | |
|---|---|---|---|
| 2,495,693 | 1/1950 | Byrd, Jr. et al. | 138/30 |
| 2,852,033 | 9/1958 | Orser | 138/30 |
| 3,061,039 | 10/1962 | Peters | 138/30 |
| 3,075,576 | 1/1963 | Herbert | 138/30 |
| 3,605,815 | 9/1971 | Von Forell | 138/30 |
| 3,665,967 | 5/1972 | Kachnik | 138/26 |
| 3,851,661 | 12/1974 | Fernandez | 138/30 |
| 4,312,382 | 1/1982 | Gebauer | 138/30 |
| 5,036,879 | 8/1991 | Ponci | 138/30 |
| 5,101,930 | 4/1992 | Fargo et al. | |
| 5,722,358 | 3/1998 | Fuesser et al. | |
| 5,732,741 | 3/1998 | Shiery | 138/30 |

FOREIGN PATENT DOCUMENTS

| | | |
|---|---|---|
| 39709/78 | 4/1992 | Australia . |
| 0 724 110 | 7/1996 | European Pat. Off. . |
| 33 00 499 | 7/1984 | Germany . |
| 42 40 324 | 6/1994 | Germany . |
| 654 092 | 1/1986 | Switzerland . |

*Primary Examiner*—James F. Hook
*Attorney, Agent, or Firm*—MacMillian, Sobanski & Todd, LLC

[57] ABSTRACT

A pulsation noise damper has an axially symmetrical housing (4) forming a chamber (3) in which pressurized hydraulic fluid flowing in an elevator system hydraulic line can expand. For the collection of contaminates in the hydraulic fluid a filter (6) is arranged at one of a pair of input/output openings (5) formed the housing (4). A pair of compression elements (7), each in the shape of an elastic bellows, are positioned in end openings (4a) formed in the housing (4) and the stiffness of each is selectively adjusted by a movable pressure plate (8) coupled to a fastening element (9). In this way the pulsation noise damper can be adapted to various levels of pulsation energy. The compression elements (7) are retained by end caps (1) attached to the housing by fasteners (2) and the fastening elements (9) extend through the end caps and are fixed by nuts (10).

6 Claims, 1 Drawing Sheet

PULSATION DAMPER FOR A HYDRAULIC ELEVATOR

BACKGROUND OF THE INVENTION

The present invention relates generally to pulsation damper for a hydraulic elevator, in which a pressurized hydraulic fluid flows in a pipe line, where, for absorption of pulsation energy present in the hydraulic fluid, the hydraulic fluid can expand in a chamber arranged to enclose the fluid line and in which at least one compression element is provided.

There is shown in the U.S. Pat. No. 5,101,930 a noise damper for the damping of pulsations in a hydraulic fluid of a hydraulic elevator. The noise damper consists essentially of a cylinder shaped closed housing, which encloses a hydraulic line. In the housing, the hydraulic line has openings forming a screen, through which the hydraulic fluid can flow out into the closed housing. Installed in the line at the center of the screen area is a disc with a central opening transversely to the direction of flow of the hydraulic fluid. The size of the central opening is such, that a portion of the hydraulic fluid flows into the housing without thereby causing an excessive pressure drop. Arranged in the housing are cylinder-shaped compression elements running parallel to the hydraulic line, with the hydraulic fluid circulating around them and which dampen the pulsations of the hydraulic fluid.

A disadvantage of the known design is that the noise damper is expensive and costly to manufacture. A further disadvantage is that the screen portion of the hydraulic line is easily contaminated (clogged) which increasingly reduces the damping action and the flow-through properties.

SUMMARY OF THE INVENTION

The present invention concerns a pulsation damper for damping noises in a hydraulic elevator including a housing having a chamber formed therein in communication with a pair of flanged inlet/outlet openings formed in a side wall of the housing, the inlet/outlet openings adapted to be connected to a hydraulic fluid line of a hydraulic elevator for receiving pressured hydraulic fluid. The housing has at least one end opening formed therein in fluid communication with the chamber and a generally cup-shaped end cap is attached to the housing to close the end opening. An adjustable compression element is positioned at the end opening between the housing and the end cap whereby pulsation energy in the pressured hydraulic fluid flowing through the chamber is absorbed by the compression element.

The present invention solves the problem avoiding the disadvantages of the known noise dampers by creating a pulsation noise damper for the hydraulic fluid, which assures to the user of the elevator, independently of the elevator installation, a greater travelling pleasure as well as a noiseless and vibration-free travel.

The advantages which are achieved by the present invention that the pulsation noise damper is simpler in its construction. It can hereby be manufactured at more favorable cost. It is a further advantage, that the pulsation noise damper is very service friendly and can be cleaned easily. This results in shorter outage times of the elevator installation for maintenance work. It is a further advantage that the pulsation noise damper can be fitted to elevator installations with varying noise properties. With only one type of damper it is possible to absorb noises of varying frequencies.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
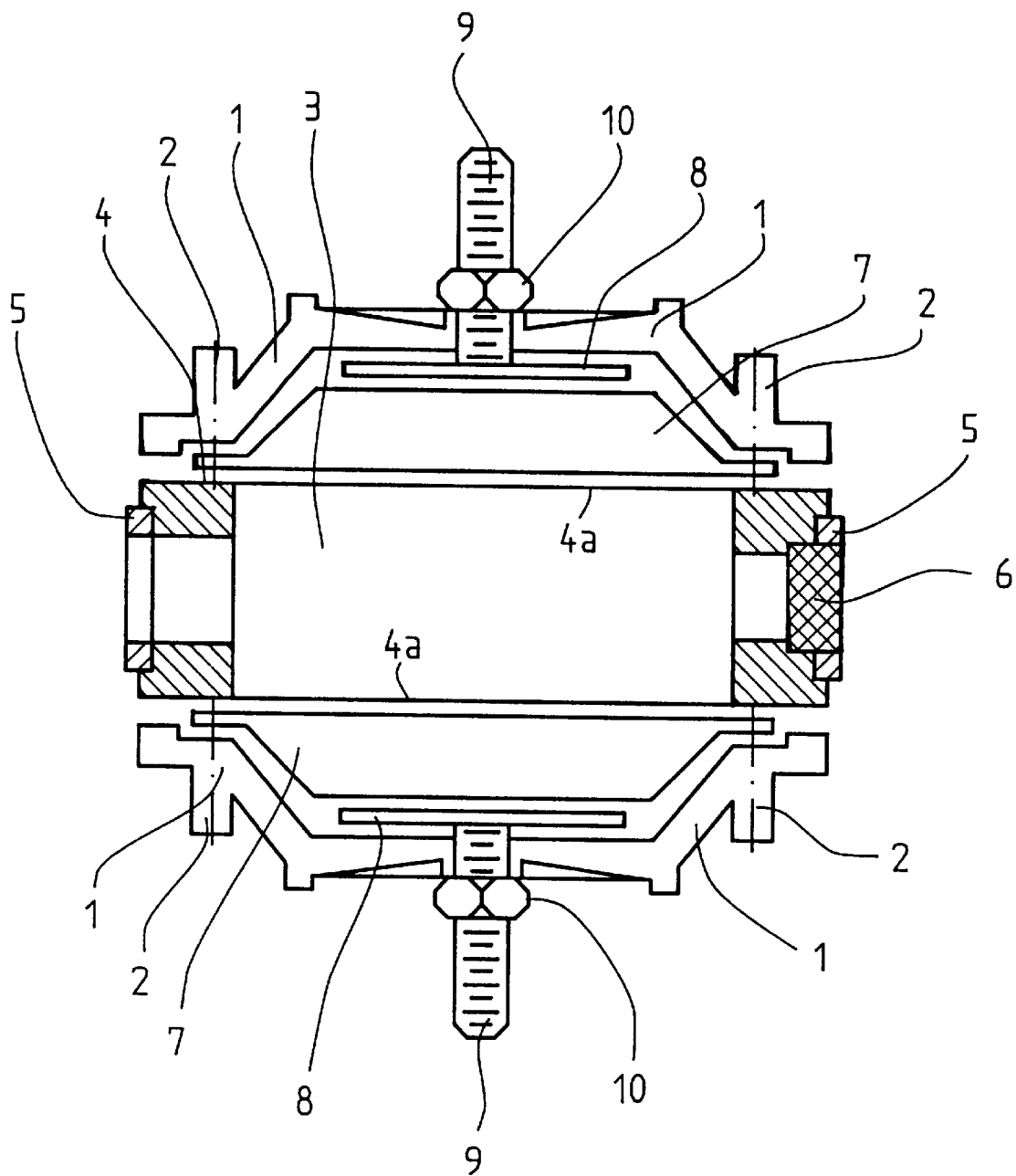
FIG. 1 is a schematic cross-sectional view of a pulsation damper in accordance with the present invention having adjustable compression elements.

Shown in the FIG. 1 is a generally cylindrical housing 4, which has a pair of flanged inlet/outlet openings 5 formed at diametrically opposed positions in a side wall of the housing for connection to a not illustrated hydraulic line. The axially symmetrical housing 4 forms an interior chamber 3, through which a hydraulic fluid flowing in the hydraulic line (not shown) can flow and expand which has the result that undesired pulsations in the hydraulic fluid are dampened and thereby a noiseless and vibration-free travel of a hydraulic elevator becomes possible. The housing 4 is open at top and bottom ends thereof which end openings 4a are closed by a pair of flanged, cup-shaped end caps 1. The hydraulic fluid flows through the chamber 3 between the flanged input/output openings 5, and for the collection of contaminates of the hydraulic fluid, a filter 6 is arranged in one of the input/output openings for example in the form of a screen.

As an example, two compression elements 7 are arranged, one in each of the end caps 1, each in the shape of a truncated cone shaped elastic bellows. For each compression element 7 a pressure plate 8 is provided, by means of which the resistance or stiffening of the compression element can be varied. The harder the compression element 7 is, the less pulsation energy of the hydraulic fluid is absorbed by the compression element. The more supple (or yielding) the compression element 7 is, the more pulsation energy of the hydraulic fluid is absorbed by the compression element.

For the adjustment of the desired absorption properties of the pulsation noise damper the pressure plate 8 is pressed, from the outside of the end cap 1 by means of a fastening element, for example in the shape of a bolt 9, more or less onto the compression element 7 whereby the stiffness of the compression element is changed. After adjustment, the bolt 9 is fixed to the end cap 1 by means of a nut 10.

The end caps 1 can be attached to the housing 4 by suitable fasteners 2 extending through apertures formed in the end caps and threadably engaging the housing. The compression elements 7 each have a radially extending flange formed thereon which flange is trapped between the housing 4 and the end cap to seal the chamber 3 at the end openings 4a. The fasteners 2 also extend through apertures formed in the compression elements 7 to fix the periphery of each compression element. Thus, each compression element 7 resists the pressure of the hydraulic fluid in the chamber 3 and flexes in response to pulsations in that fluid.

In summary, the pulsation damper according to the present invention for damping noises in a hydraulic elevator includes: the housing 4 having the chamber 3 formed therein in communication with the pair of inlet/outlet openings 5 formed in the side wall of the housing, the inlet/outlet openings adapted to be connected to a hydraulic fluid line of a hydraulic elevator, the housing having at least one end opening 4a formed therein in fluid communication with the chamber. The damper further includes the end cap 1 attached to the housing 4 and closing the end opening 4a and the adjustable compression element 7 positioned at the end opening 4a between the housing 4 and the end cap 1. When the inlet/outlet openings 5 are connected to a hydraulic elevator line, pressured hydraulic fluid flowing in the line flows through the chamber 3 and the compression element 7 absorbs pulsation energy present in the pressured hydraulic fluid flowing through the chamber.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A pulsation damper for damping noises in a hydraulic elevator, the elevator having pressurized hydraulic fluid flowing in a line for operating the elevator, the damper comprising:

a housing having a chamber formed therein, at least a pair of inlet/outlet openings formed in sides of said housing in communication with said chamber and adapted to be connected to a hydraulic fluid line of a hydraulic elevator, and at least one end opening formed in an end of said housing in communication with said chamber;

a compression element positioned at said one end opening and having a peripheral flange;

an end cap attached to said housing trapping said peripheral flange between said end cap and said housing about said one end opening thereby sealing said one end opening from passing pressured hydraulic fluid from said chamber;

a pressure plate positioned between said end cap and said compression element; and a fastening element connected to said pressure plate and extending through said end cap for selectively pressing said pressure plate against said compression element to adjust a resistance of said compression element to expansion of pressured hydraulic fluid in said chamber whereby when said inlet/outlet openings are connected to a hydraulic elevator line and pressured hydraulic fluid flows through said chamber, said compression element absorbs pulsation energy present in the pressured hydraulic fluid flowing through said chamber to dampen noises.

2. The pulsation damper according to claim 1 wherein said fastening element is threadably engaged with said end cap and including a nut threadably engaged with said fastening element outside said end cap for fixing said pressure plate in a selected position.

3. The pulsation damper according to claim 1 including a filter mounted in one of said input/output openings for collecting contaminates in the pressured hydraulic fluid flowing through said chamber.

4. A pulsation damper for damping noises in a hydraulic elevator, the elevator having pressurized hydraulic fluid flowing in a line for operating the elevator, the damper comprising:

a housing having a chamber formed therein, at least a pair of inlet/outlet openings formed in sides of said housing in communication with said chamber and adapted to be connected to a hydraulic fluid line of a hydraulic elevator, and at least one end opening formed in an end of said housing in communication with said chamber;

a cone shaped elastic bellows compression element positioned at said one end opening and having a peripheral flange; and a cup shaped end cap attached to said housing trapping said peripheral flange between said end cap and said housing about said one end opening thereby sealing said one end opening from passing pressured hydraulic fluid from said chamber whereby when said inlet/outlet openings are connected to a hydraulic elevator line and pressured hydraulic fluid flows through said chamber, said compression element absorbs pulsation energy present in the pressured hydraulic fluid flowing through said chamber to dampen noises.

5. A pulsation damper for damping noises in a hydraulic elevator, the elevator having pressurized hydraulic fluid flowing in a line for operating the elevator, the damper comprising:

a housing having a chamber formed therein, at least a pair of inlet/outlet openings formed in sides of said housing in communication with said chamber and adapted to be connected to a hydraulic fluid line of a hydraulic elevator, and a pair of end openings formed in opposite ends of said housing in communication with said chamber;

a pair of compression elements each positioned at an associated one of said end openings and having a peripheral flange;

a pair of end caps attached to said housing each trapping said peripheral flange of an associated one of said compression elements between said end cap and said housing thereby sealing said end openings from passing pressured hydraulic fluid from said chamber;

a pair of pressure plates each positioned between an associated one of said end caps and said associated compression element; and a pair of fastening elements each connected to an associated one of said pressure plates and extending through an associated one of said end caps for selectively pressing said associated pressure plate against said associated compression element to individually adjust a resistance of said associated compression element to expansion of the pressured hydraulic fluid in said chamber whereby when said inlet/outlet openings are connected to a hydraulic elevator line and pressured hydraulic fluid flows through said chamber, said compression elements absorb pulsation energy present in the hydraulic fluid flowing through said chamber to dampen noises.

6. The pulsation damper according to claim 5 wherein each said fastening element is threadably engaged with said associated end cap and including a nut threadably engaged with said fastening element outside said associated end cap for fixing said associated pressure plate in a selected position.

* * * * *